C. E. LINEBARGER.
THERMOSCOPE.
APPLICATION FILED FEB. 26, 1919.
1,374,857.
Patented Apr. 12, 1921.
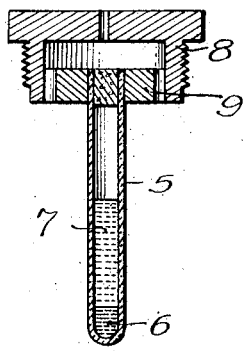
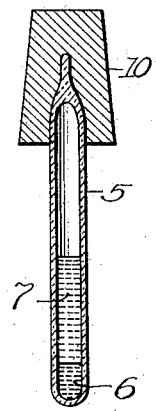
Witness:
L. W. Novander
Inventor
Charles E. Linebarger
By E. J. Andrews
Atty

UNITED STATES PATENT OFFICE.

CHARLES E. LINEBARGER, OF CHICAGO, ILLINOIS.

THERMOSCOPE.

1,374,857. Specification of Letters Patent. Patented Apr. 12, 1921.

Application filed February 26, 1919. Serial No. 279,290.

*To all whom it may concern:*

Be it known that I, CHARLES E. LINEBARGER, a citizen of the United States, residing at Chicago, in the county of Cook and State of Illinois, have invented certain new and useful Improvements in Thermoscopes, of which the following is a full, clear, and exact specification.

This invention relates to devices for detecting when the temperature of a given place passes through a fixed point. The object of the invention is to produce means whereby the temperature to which the device is subjected will cause readily detectible changes in its appearance, so that an observer can ascertain whether the temperature is at, above or below a certain amount.

There are various pairs of liquids known to chemists that are insoluble, or partially miscible in each other below a certain temperature, but completely miscible above that temperature. Examples of such pairs of liquids are: Water and phenol; water and propionitril; water and furfurol; water and acetylacetone; water and isobutyric acid, hexane and methyl alcohol; carbon bisulfid and methyl alcohol; resorcin and benzene; aqueous solutions of many salts with acetone or methyl, ethyl or propyl alcohol. Mixtures of such pairs of liquids separate into two layers below a certain temperature but mix perfectly above that temperature. Different temperatures correspond to different proportions of the layer-forming liquids as well as to different pairs of liquids. Also, in the case of several pairs of liquids, different proportions may produce layer formations at the same temperature.

It is a well known fact that storage batteries are injured if the temperature rises much above 110° Fahrenheit, and that they function best at temperatures around 90° Fahrenheit. If a vessel containing a pair of layer-forming liquids be placed near, or within, a storage battery, and if the liquids chosen be mixed in such proportions as to become free from layers when the temperature rises to the danger point, the disappearance of the layers will give an observer information in regard to the temperature of the battery, to the end that he can take measures to change the same.

With some pairs of liquids a change of temperature of less than half a degree Fahrenheit can be easily detected. When, for example, a mixture of about 74 parts (by weight) of carbon bisulfid with 26 parts of methyl alcohol is heated above 100° Fahrenheit, it forms a perfectly clear liquid, but the lowering of the temperature by half a degree produces a cloudiness very apparent to the eye, and at a slightly lower temperature, the contents of the containing vessel are seen to be in two layers. The addition of a dye or coloring matter, that is insoluble in one of a pair of liquids, but soluble in the other, frequently helps in distinguishing the existence of layers.

The separation into layers is a much slower process when the liquids have nearly the same specific gravities or are viscous. For these reasons I prefer to use, at least in testing the temperature of storage batteries, the liquids, carbon bisulfid and methyl alcohol, as they are mobile and not very viscous, and have quite different densities.

The accompanying drawings illustrate the manner in which I apply my invention. Figure 1 is an elevation of a temperature indicating device, to be used with electric batteries; and Fig. 2 is a similar device which may be floated on the liquid the temperature of which is to be noted.

For use in storage batteries I put in a suitably containing vessel, preferably of tubular form, for example, a glass tube 5, such proportions of a pair of liquids, preferably the carbon bisulfid 6 and methyl alcohol 7, as will form into layers when the temperature is lowered to a certain desired or predetermined point or degree. The containing vessel may be attached to the underside of a vent cap or plug 8 of the cell of the battery, in any suitable manner; for example by forcing it through a hole in the rubber disk 9. By removing the vent, and thus the tube, from the vessel, a glance at the liquids will disclose whether they are still separated in layers, or whether they have mixed and become cloudy. In the latter case the temperature indicated will be too high. For convenience, in some cases, I attach the tube to a float, such as a cork 10, so that the device will float on the liquid, and the temperature condition thereof may be readily determined by lifting the device out of the liquid, by grasping the cork, and observing the condition of the liquids. If necessary the device may be shaken, so as to mix the liquids and more clearly disclose their condition.

I claim as my invention:

1. A battery temperature indicator comprising a cell vent cap having an annular flange projecting from the lower side thereof, a rubber disk positioned within said flange and spaced from the body of said cap, said disk having two openings therethrough, a transparent container, and two liquids of unlike densities in said container capable of forming a physical mixture at a certain temperature; one end of said container being positioned in one of said openings, whereby when said cap is in place in one of the cells of the battery the container will project into the electrolyte of said cell.

2. A battery temperature indicator comprising a cell vent cap, a transparent container fixed to said cap and arranged to project into the cell when the cap is fixed thereon, and two liquids of unlike densities and colors contained in said container and adapted to form a physical mixture at a predetermined temperature.

3. A liquid temperature indicator comprising a filling cap for the vessel containing the liquid the temperature of which is to be determined, a transparent container fixed to the said cap and arranged to project into said vessel when the closure is fixed thereon, and two liquids of unlike densities and apperances contained in said container and adapted to form a physical mixture at a predetermined temperature.

In testimony whereof, I hereunto set my hand.

CHARLES E. LINEBARGER.